United States Patent
Badeau et al.

(10) Patent No.: US 9,979,837 B2
(45) Date of Patent: May 22, 2018

(54) COMMUNICATION MAXIMIZATION STRUCTURE AND SYSTEM

(71) Applicants: Francois Badeau, Las Vegas, NV (US); Andrew Mack, San Clemente, CA (US)

(72) Inventors: Francois Badeau, Las Vegas, NV (US); Andrew Mack, San Clemente, CA (US)

(*) Notice: Subject to any disclaimer, the term of this patent is extended or adjusted under 35 U.S.C. 154(b) by 0 days. days.

(21) Appl. No.: 15/080,362

(22) Filed: Mar. 24, 2016

(65) Prior Publication Data

US 2017/0279973 A1 Sep. 28, 2017
US 2018/0103155 A9 Apr. 12, 2018

Related U.S. Application Data

(63) Continuation of application No. 14/328,144, filed on Jul. 10, 2014, now Pat. No. 9,300,782.
(Continued)

(51) Int. Cl.
*H04M 1/66* (2006.01)
*H04M 17/02* (2006.01)
(Continued)

(52) U.S. Cl.
CPC .......... *H04M 17/026* (2013.01); *A47B 3/00* (2013.01); *A47B 39/00* (2013.01); *A47B 97/00* (2013.01);
(Continued)

(58) Field of Classification Search
USPC .................. 345/1.1; 705/14.14; 700/237
See application file for complete search history.

(56) References Cited

U.S. PATENT DOCUMENTS

2006/0050012 A1* 3/2006 Eller .................. G06Q 30/0277
345/1.1
2009/0018911 A1* 1/2009 An Chang ............. G06Q 30/02
705/14.14
(Continued)

FOREIGN PATENT DOCUMENTS

GB 2483703 A * 3/2012 ............. G09F 21/04

*Primary Examiner* — David Q Nguyen

(57) ABSTRACT

A communication structure for both personal communication services and broadly disseminated communication services is described. The communication structure includes a communication unit having telecommunication capability enabling a user of the communication structure to communicate to a remote individual. The communication structure also including multiple displays capable of displaying text, image, video data and further including non-digital advertising surfaces for displaying static images and a speaker system for broadcasting messages. The multiple displays and non-digital advertising surfaces allowing for communication with individuals within visual range of the communication structure. The multiple displays having synchronization capability, allowing for coordination of the text, image and video data displayed. The communication structure being connectable to other communication structures and the multiple displays of the multiple communication structures also having synchronization capability. The multiple displays, non-digital advertising surfaces and speaker system providing a communication platform for widespread dissemination of advertisements and other messages.

28 Claims, 10 Drawing Sheets

Related U.S. Application Data

(60) Provisional application No. 61/898,444, filed on Oct. 31, 2013.

(51) Int. Cl.

| | | |
|---|---|---|
| *H04M 1/02* | (2006.01) | |
| *H04M 1/247* | (2006.01) | |
| *H04M 3/487* | (2006.01) | |
| *H04M 1/60* | (2006.01) | |
| *G06Q 30/02* | (2012.01) | |
| *A47B 97/00* | (2006.01) | |
| *A47B 39/00* | (2006.01) | |
| *A47B 3/00* | (2006.01) | |
| *H04N 7/18* | (2006.01) | |
| *H04W 88/08* | (2009.01) | |
| *H04W 84/12* | (2009.01) | |
| *H04W 4/00* | (2018.01) | |
| *H04W 4/02* | (2018.01) | |

(52) U.S. Cl.
CPC ...... *G06Q 30/0271* (2013.01); *H04M 1/0295* (2013.01); *H04M 1/2478* (2013.01); *H04M 1/6033* (2013.01); *H04M 3/4878* (2013.01); *H04N 7/181* (2013.01); *A47B 2097/005* (2013.01); *H04M 2201/38* (2013.01); *H04M 2242/02* (2013.01); *H04M 2242/04* (2013.01); *H04M 2250/12* (2013.01); *H04M 2250/16* (2013.01); *H04M 2250/22* (2013.01); *H04M 2250/52* (2013.01); *H04W 4/008* (2013.01); *H04W 4/023* (2013.01); *H04W 84/12* (2013.01); *H04W 88/08* (2013.01)

(56) References Cited

U.S. PATENT DOCUMENTS

| | | | | |
|---|---|---|---|---|
| 2009/0267867 | A1* | 10/2009 | Gonia | G06F 3/1454 345/1.1 |
| 2013/0143651 | A1* | 6/2013 | Harrison | H04L 63/107 463/31 |
| 2014/0184906 | A1* | 7/2014 | Chung, II | H04N 21/4126 348/465 |
| 2015/0019010 | A1* | 1/2015 | Smith | G07F 11/002 700/237 |
| 2016/0182613 | A1* | 6/2016 | Brune | H04L 67/10 709/217 |

* cited by examiner

COMMUNICATION MAXIMIZATION STRUCTURE AND SYSTEM

RELATED APPLICATIONS

This application is a continuation of U.S. patent application Ser. No. 14/328,144, filed Jul. 10, 2014, now U.S. Pat. No. 9,300,782, which claims priority to U.S. provisional patent application No. 61/898,444, filed Oct. 31, 2013 and titled "Communication Maximization Structure and System," both of which are incorporated herein by reference in their entirety.

BACKGROUND

Technical Field

This structure and system relates generally to the communication arts and more specifically to an advertising and communication structure and system. More particularly, in one example, the invention relates to a structure and system which utilizes the traditional payphone infrastructure, offers individualized and personal communication services and additionally offers the ability to broadcast and communicate with a broad audience.

Description of Related Art

Payphones, telephones available for a fee, are commonly found on street corners, near stores and restaurants, and at transportation hubs such as airports and train stations, among several other places. Payphones provide the public with an inexpensive way to communicate with friends, family, businesses, emergency agencies and others. Payphones traditionally operate on a "user-pays" system and have enjoyed success for several decades. Under the user-pays system, the user making the phone call must pay a defined amount to make a phone call and may be required to pay additional money to continue the phone call. The money paid by the user is then collected by the payphone operator or owner. The money collected is used to pay for payphone maintenance and calling costs. However, with the advent of the mobile phone, payphones often go unused as many would rather use their mobile phone than pay a fee to call from a payphone. For this reason, owners and operators of payphones no longer have the funds necessary to maintain the payphones, causing the phones to fall into disrepair.

Although many prefer the convenience of a mobile phone to a payphone, mobile phones are susceptible to several limitations. For example, mobile phone networks often fail during regional or national emergencies as the mobile phone network may become overloaded. Even when the network is operating properly, mobile phone users are limited to network coverage, which is often inconsistent or even nonexistent in some areas. This is true even in very large cities in areas such as subways and parking structures. Mobile phones also are reliant on battery power which is by nature limited. This frustration is well known to travelers who often find their mobile phone battery depleted after a long day of travel, leaving the traveler unable to update their loved ones or coordinate a pickup location. These limitations also pose public safety concerns in areas such as airports or metro stations, where the public is often relied upon to alert emergency authorities of an ongoing emergency. Often times, such areas display signs requesting the general public to call a certain number if they observe suspicious behavior or objects. While some jurisdictions obligate entities overseeing certain public or semi-public areas to provide payphone services, the owners and operators of these payphones struggle to pay for the costs of the payphone and often operate at a loss. For these reasons, it is desirable to provide public telephone services having payment model capable of sustaining maintenance and calling costs.

In an effort to provide affordable public telephone services, some providers have turned to advertising as an alternative to the traditional user-pays system. Under the "advertiser-pays" system, an advertising display may be affixed to or otherwise incorporated into the telephone device and the revenue generated by the advertisement may be applied to the calling and maintenance costs. The user is then free to make phone calls without paying. It is contemplated that the free telephone calls may attract users, exposing them to the advertisements. Additionally, individuals passing by the telephone structure will also be exposed to the advertisements. While this solution is an improvement on the user-pays model, it has achieved only limited success. One reason for its limited success is that the general public is often unaware that the phone calls can be made for free. After decades of familiarity with the user-pays system, the general public, often assumes that these telephones require payment. A larger reason for the limited success is that the national advertisers willing to pay a substantial advertising fee have generally deemed the advertisement delivery system too localized to support a national campaign. The advertisement delivery system often consists of a single video screen which repeats advertisements on a loop. While the user of the phone is certainly within range of this advertisement, it is unlikely that individuals passing by will even notice the advertisement. For this reason, under the advertiser-pays system described, advertising revenue is limited and often cannot sustain maintenance and calling costs.

SUMMARY

The following presents a simplified summary in order to provide a basic understanding of some aspects of the claimed subject matter. This summary is not an extensive overview. It is not intended to identify key or critical aspects or elements or to delineate the scope of the claimed subject matter. Its sole purpose is to present some concepts in a simplified form as a prelude to the more detailed description that is presented later.

The present invention is a communication structure and system for simultaneous personal and broadcast communications. In embodiments, the communication structure and system offers private telecommunication capabilities while at the same time offering a platform from which a broad audience can be reached. Accordingly, the communication structure is capable of communicating an advertisement message to a broad audience and is thus capable of supporting a national advertising campaign. It is understood that the revenue generated from national advertising campaign may pay for the telecommunication and maintenance costs of the communication structure.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
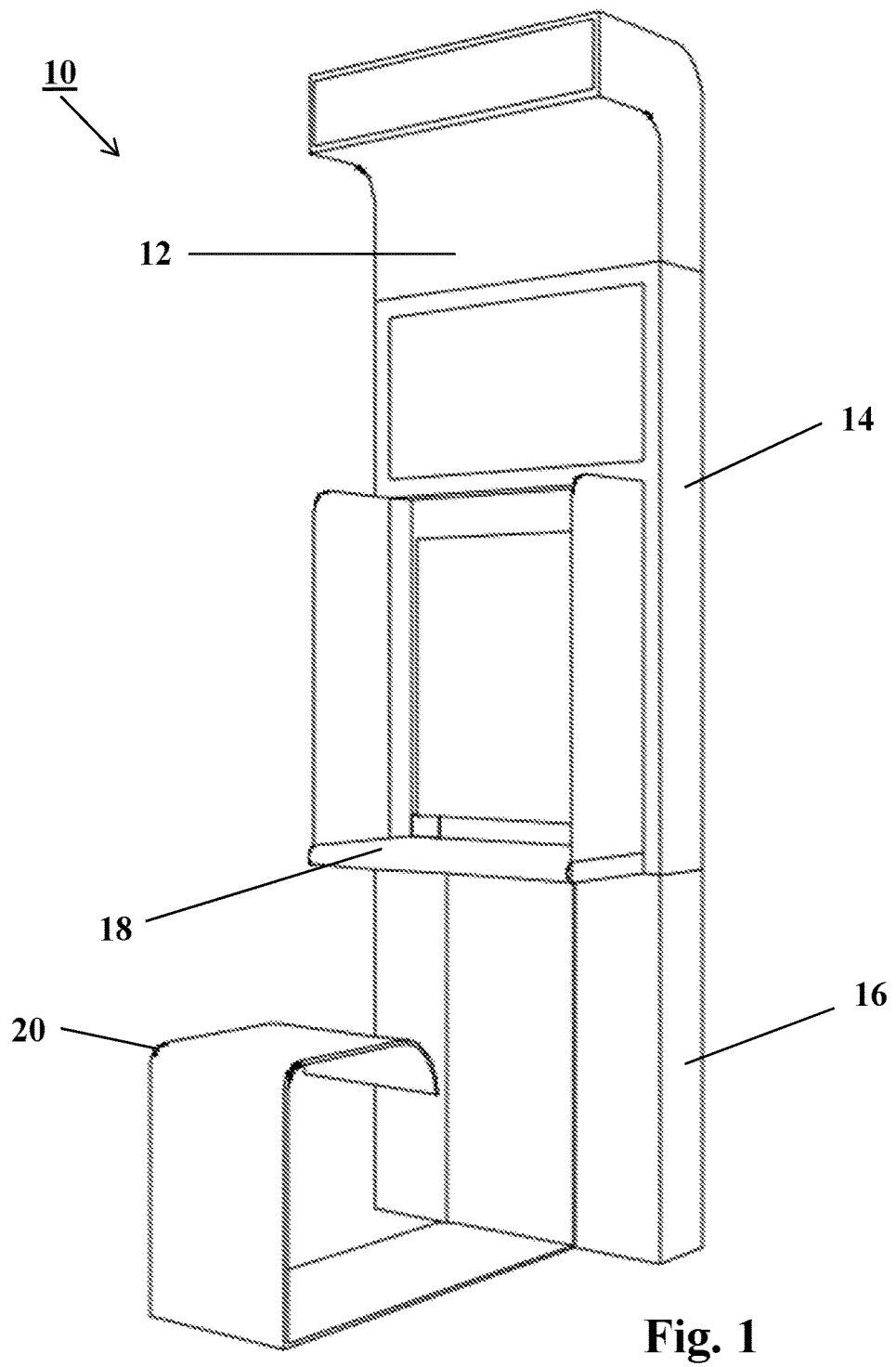
FIG. 1 is a perspective view of a communication structure in accordance with the present invention.

Referring now to FIG. 1, a communication structure 10 is shown. The communication structure 10 is capable of personal communication between a user of the structure and an individual accessing a remote communication device. Simultaneously, the communication structure 10 is capable of broadly communicating to individuals within visual and audial range of the communication structure 10. For example, the communication structure 10 may connect a user to an individual at a remote location by telephone, email or social media, and at the same time the communication structure 10 may broadly disseminate advertising messages by way of displays not being utilized by the user and audio messages. In this manner, the communication structure 10 provides a system which simultaneously allows a user to communicate on a personal level and also allows for an advertiser to communicate to individuals in visual and audial range of the communication structure 10. It also understood that emergency messages or other informative information may be communicated to individuals in visual and audial range of the communication structure 10.

In one embodiment, communication structure 10 is divided into a modular upper unit 12, a modular middle unit 14, and a modular bottom unit 16. In one embodiment the modular middle unit 14 and modular bottom unit 16 may take a rectangular type shape while the modular upper unit 12 may take a canopy type shape. It is understood, however, that the modular units may take any other shape such as triangular or round. In dividing the communication structure 10 into three modular units, the difficulty of transporting, handling and storing the communication structure 10 is eased. Further, the three modular units allow for simple assembly of the communication structure 10. However, it is understood that the communication structure 10 may alternatively be comprised of less than or more than three modular units. In one embodiment the communication structure 10 may not be modular but instead may take the form of a single structure. It is further contemplated that the communication structure 10 may be made from wood, wood composite, various metals, various plastics, a combination of wood, metal and plastic, or any other material capable of forming a rigid structure.

The communication structure may include a desk structure 18. The desk structure 18 may extend from the modular middle unit 14. In one embodiment, the modular middle unit 14 may have a recessed portion from which the desk structure 18 may extend from. It is also contemplated that the desk structure 18 may fold into the recessed portion of the modular middle unit 14 or otherwise fit within the recessed portion for handling and storing. Alternatively, the desk structure 18 may extend from the modular bottom unit 16 or from some other surface of the communication structure 10. In another embodiment, the communication structure 10 may not include the desk structure 18.

The communication structure 10 may also include a seat structure 20. In one embodiment, the seat structure 20 may extend from or otherwise be affixed to the modular bottom unit 16. The seat structure 20 may take the form of a partially open rectangle having a curved portion for a seating surface. In this configuration the edge of the seat structure 20 in contact with the modular bottom unit 16 may be permanently or removably affixed. For example, the seat structure 20 may be attached to the modular bottom unit 16 using screws, glue or epoxy or may slide into an opening in the modular bottom unit 16 meant for receiving the seat structure 20. In a different embodiment, the seat structure 20 may take a different shape, may be cantilevered from the modular bottom unit 16 or may even be detached from the modular bottom unit 16 and instead stand alone. It is also contemplated that the seating structure may be retractable or removable to allow for disability access. Alternatively, the communication structure 10 may not include a seat structure 20.

Figure 2:
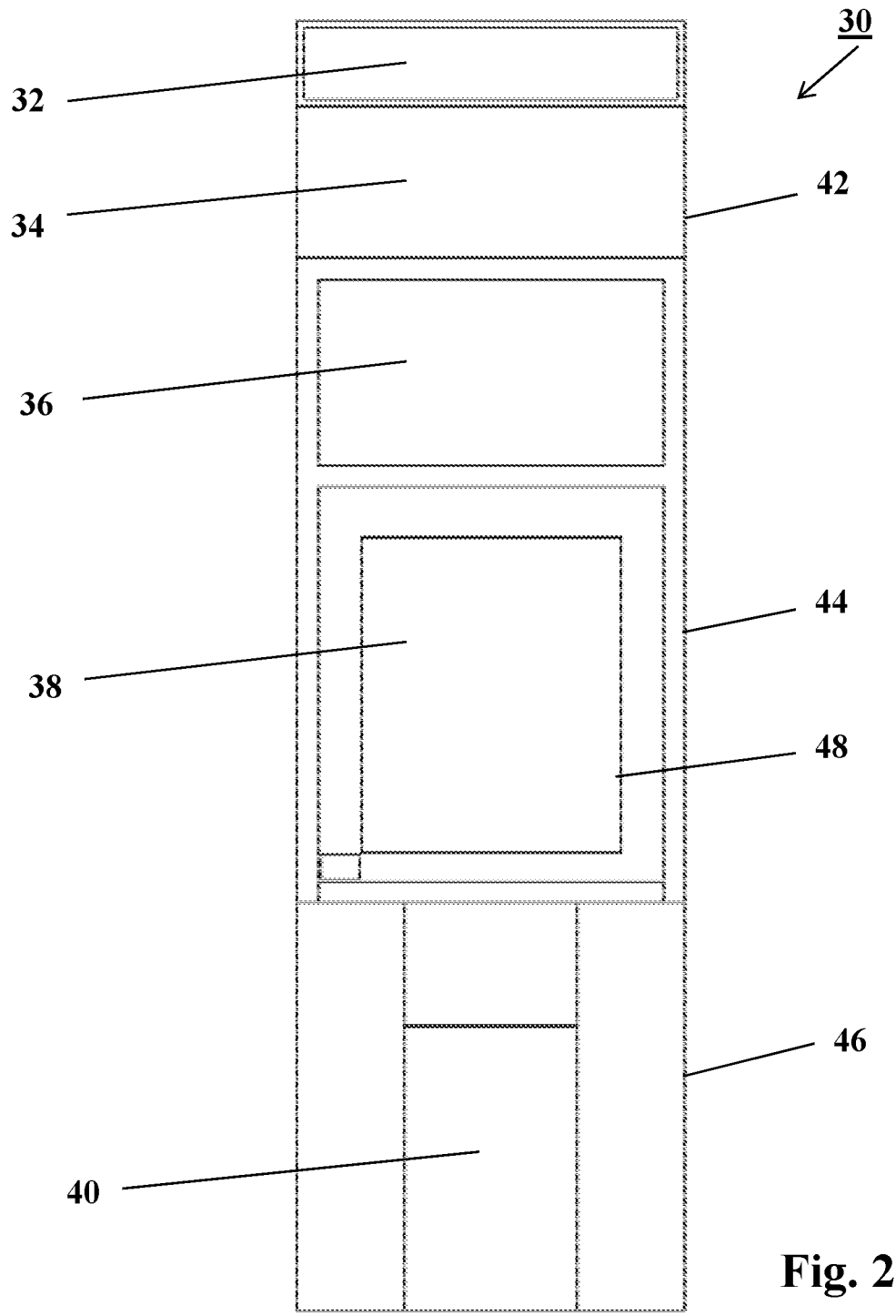
FIG. 2 is a front view of a communication structure in accordance with the present invention.

Referring now to FIG. 2, the communication structure 30 is shown. FIG. 2 shows a front view of the communication structure 30 and incorporates the limitations illustrated in FIG. 1. In this embodiment, the communication structure 30 may include a top display 32, an upper display 36, a lower display 38 and a communication unit 48. In one embodiment the lower display 38 may be a component of a communication unit 48. However, in other embodiments, the lower display 38 may be separate from the communication unit 48. It is also understood that the lower display and the communication 48 comprise a single device. It is further understood that the top display 32, upper display 36, lower display 38 and communication unit 48 are in communication with one another either wirelessly or by cable connection. It is contemplated that the communication unit 30 provides both telecommunication capabilities and acts as the controller of the top display 32, upper display 36 and lower display 38. The top display 32, upper display 36 and lower display 38 may display text, images and video. The top display 32, upper display 36 and lower display 38 may take any shape including a narrow ticker type shape, a larger rectangular shape commonly used for televisions and computer monitors or even a square shape. The top display 32, upper display 36 and a lower display 38 may take the form of a liquid crystal display (LCD), plasma display or any other like display capable of displaying text, images and video. It is further understood that the communications structure 30 may include fewer than or more than three displays and that the displays may be arranged and positioned in a manner different than the one shown in FIG. 2.

It is understood that the top display 32, upper display 36 and a lower display 38 together form a broadcast platform from which advertisement messages and other information may be broadly disseminated to a wide audience. In one implementation, the top display 32, upper display 36 and a lower display 38 may each display three separate advertisements. However, in another embodiment, the top display 32, upper display 36 and a lower display 38 may display the same advertisement or may display different parts of a coordinated advertisement. It is also understood that the top display 32, upper display 36 and a lower display 38 may be accessed and programmed remotely. In this manner, the top display 32, upper display 36 and a lower display 38 may be utilized by remote government authorities or other overseeing authorities to display emergency information such as a map for evacuation, the direction of the nearest exit, other informative information regarding ongoing emergencies, or even a warning about a possible event. Similarly the top display 32, upper display 36 and a lower display 38 may be utilized as an alarm system or may even display the identification of a suspect. It is also contemplated that the top display 32 or other portions of the communication structure 30 is capable of alerting the general public that the communication structure 30 may be used without paying a fee.

In another embodiment, the communication structure 30, may further include a cellular service signal enhancer. It is contemplated that the signal enhancer may be stored within the modular bottom unit 46. It is understood that the signal enhancer may amplify the cellular signal in the immediate area surrounding the communication structure 30 and ultimately extend network coverage. Accordingly, individuals that are near the communication structure 30 that otherwise would not have ample network coverage for use of their mobile devices, may be provided sufficient coverage within a certain range of the communication structure 30. For this reason, individuals may be attracted to the area near the communication structure 30. Accordingly, the signal enhancer may attract a larger audience for disseminating or broadcasting messages, including advertising messages and emergency messages.

It is contemplated that the top display is positioned near the top of the communication structure 30. While, it is understood that the top display 32 may be located in the modular upper unit 42, it may alternatively be located in the modular middle unit 44 or near the top of a nonmodular communication structure 30. Likewise, it is contemplated that the upper display 36 be incorporated into the modular middle unit 44 but it is understood that the upper display may alternatively be placed in the modular upper unit 42, the modular bottom unit 46 or towards the middle of a non-modular communication structure 30. Additionally, the lower display 38 is contemplated to be secured to the modular middle unit 44 but may alternatively be secured to a modular bottom unit 16 or towards the bottom of a non-modular communication structure 30. It is further contemplated that the top display 32, upper display 36 and a lower display 38 may include a speaker system for broadcasting audio messages corresponding with the text, audio and video displayed. Alternatively, it is contemplated that a speaker system for broadcasting audio messages may be included in the communication structure 30 separate from the top display 32, upper display 36 and a lower display 38.

The communication structure 30 may also include an upper non-digital display surface 34 and a lower non-digital display surface 40. It is contemplated that the upper non-digital display surface 34 exists on the modular upper unit 42 and the lower non-digital display surface 40 exist on the modular bottom unit 46, though the upper non-digital display surface 34 and the lower non-digital display surface 40 may exist on the surface of any part of the communication structure 30. More specifically the lower non-digital display surface 40 may exist on the back of a seat structure or, in the absence of a seat structure, may be displayed on the front of the modular bottom unit 46. It is contemplated that the upper non-digital display surface 34 and lower non-digital display surface 40 display non-digital images representing company names, slogans or depictions of a company product or logo. The non-digital images may be in the form of paint or other marking substance or in the form of a printed image or printed text capable of being affixed to the surface. Further, the top display 32, upper display 36 and lower display 3 8 may also include non-digital images affixed to the structure of each display device.

Figure 3:
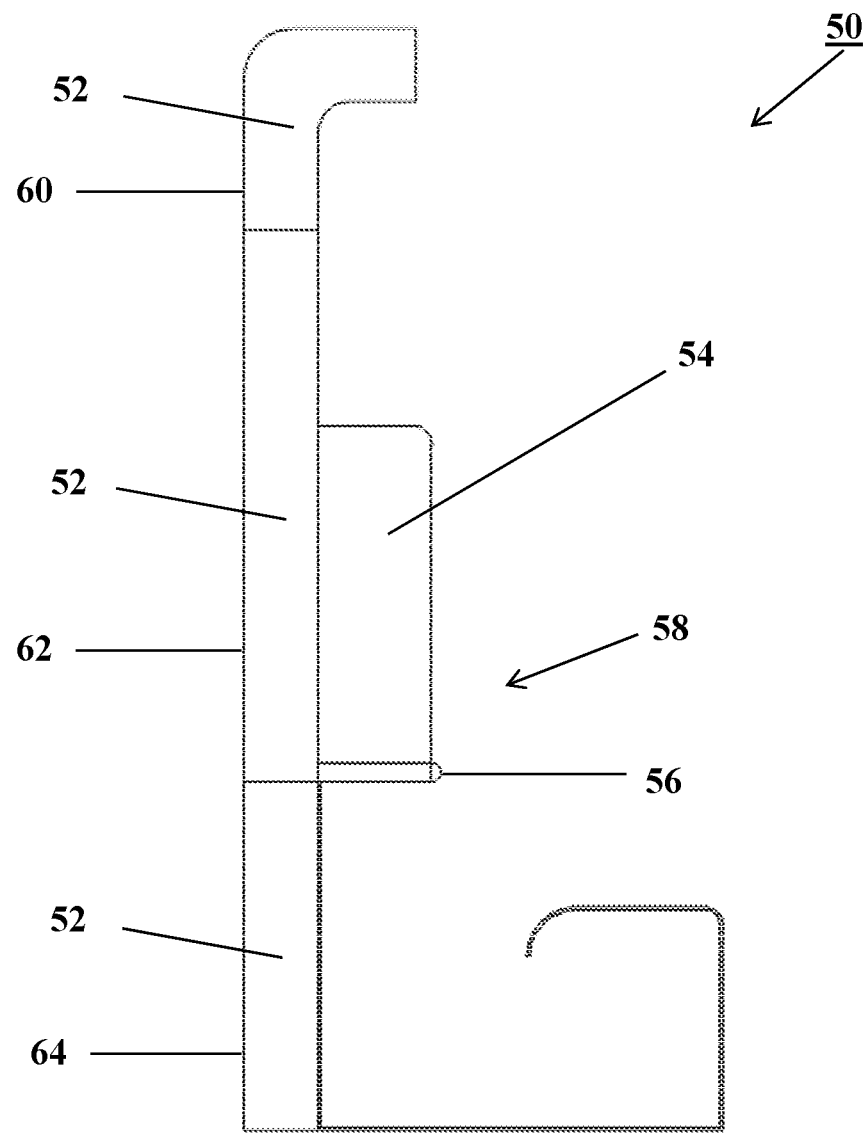
FIG. 3 is a side view of a communication structure in accordance with the present invention.

Referring now to FIG. 3, the communication structure 50 is shown. FIG. 3 shows a side view of the communication structure 50 and incorporates the limitations illustrated in FIG. 1. The communication structure 50 may be oriented such that the sides the structure are exposed. Where the sides of the communication structure 50 are exposed, non-digital displays may be affixed to the non-digital side display surface 52. The non-digital side display surface 52 may exist on the modular upper unit 60, the modular middle unit 62 or the modular bottom unit 64. Alternatively, the non-digital side display surface 52 may span the entire length of the side of the communication structure 50. Like the upper non-digital display surface 34 and lower nondigital display surface 40 of FIG. 2, the non-digital side display 52 may be in the form of paint or other marking substance or in the form of a printed image or printed text capable of being affixed to the surface.

In one embodiment, the desk structure 58 of the communication structure 50, may include a privacy partition 54. It is contemplated that a privacy partition 54 may exist at the two ends of the desk structure 58. However, in other embodiments only one privacy partition 54 may be utilized. The desk structure 58 may also include a desktop 56 which is a rigid flat surface extending out perpendicularly or nearly perpendicular from the communication structure 50. In one embodiment, the desktop 56 is made from a rigid material such as wood, metal, or plastic and is immovably secured to the communication structure. It is contemplated that the desktop 56 may be positioned between two privacy partitions 54 but understood that the desktop may or may not span the entire distance between the privacy screens. It is also contemplated that the surface of the desktop 56 be oriented and secured to support a computing device, reading material or other reading or writing related objects. The desktop 56 may be shaped in the form of a rectangle or alternatively the desktop may take the form of a "U" shape such that the desktop 56 may extend around the user on either side. The surface of the desktop 56 may further serve as a non-digital display surface for displaying advertisements.

Figure 4:
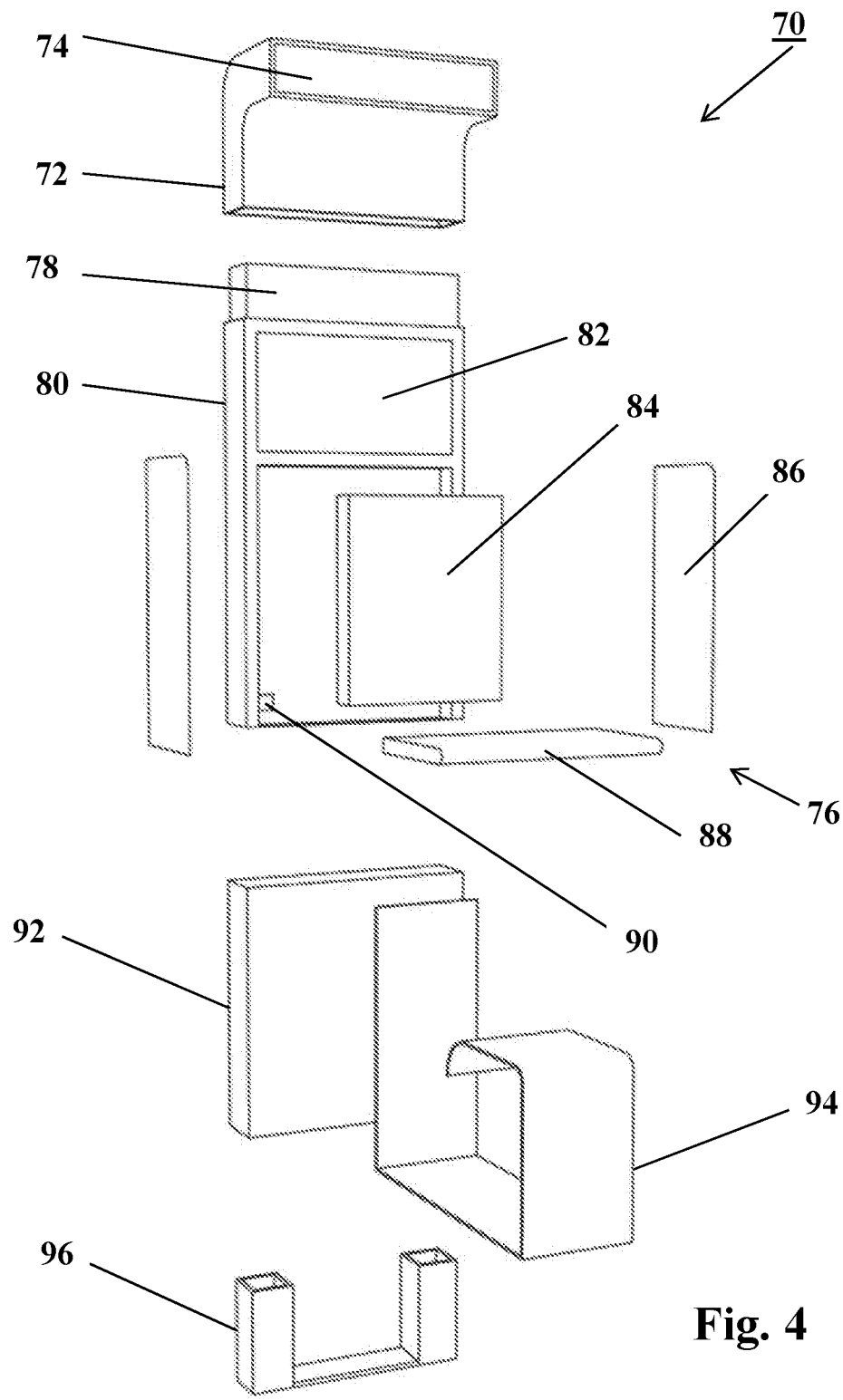
FIG. 4 is an exploded view diagram of a communication structure in accordance with the present invention.

Referring now to FIG. 4, a communication structure 70 is shown. FIG. 4 shows an exploded view of a communication structure 70 and incorporates the limitations illustrated in FIG. 1. The communication structure 70 may be secured by way of an anchoring structure 96. The anchoring structure 96 may be affixed to the floor or similar building structure by, for example, screwing the anchoring structure 96 into the floor or building structure. Alternatively, the communication structure 70 may be welded to the floor or building structure or glued to the floor or building structure. It also contemplated that the anchoring structure 96 may be affixed to preexisting infrastructure such as a structure that previously housed or supported a user-pays payphone system. In other embodiments however, the communication structure 70 itself may be affixed to the floor, building structure or preexisting infrastructure using similar means. The anchoring structure 96 may also house electrical hardware and provide connection to an electrical source or communication source. For example, the anchoring structure 96 may connect to a power port as well as communication hardware such as a category 5 cable or other or similar communication hardware. The anchoring structure 96 may take the form of a "U" shaped structure illustrated in FIG. 4 or alternatively may take any form suitable for securing the communication structure 70 to the floor, building structure or preexisting infrastructure such as a box type structure.

In one embodiment, the modular bottom unit 92 may be designed to incorporate anchor receptors such that the modular bottom unit 92 may receive the anchor structure 96. In this manner, the anchor structure 96 may support the modular bottom unit 96, preventing at least lateral movement in any direction. Yet in another embodiment, the modular bottom unit 92 may be designed to affix to the floor or building structure without the use of an anchoring structure 96. The seat structure 94 may be affixed to the modular bottom unit 92 and may also provide support for the communication structure 90. It is contemplated that the seat structure 94 may be received by the modular bottom unit 92 wherein the modular bottom unit 92 has a seat structure receptacle area such that the seat structure 94 may be slid into the receptacle area. Upon subsequently connecting the modular bottom unit 92 to the anchoring structure 96, the seating structure 94 may become locked into place, unable to move in any direction. Alternatively, the seat structure 94 may be glued, screwed or otherwise rigidly secured to the modular bottom unit 92 in addition to, or alternatively to, the floor or building structure.

The modular middle unit 80 may be rigidly connected to the modular bottom unit 92. It is contemplated that the modular middle unit 80 and modular bottom unit 92 may have a connecting protrusion and receptacle area much like the connection between the anchoring structure 96 and the modular bottom unit 92. Alternatively, the modular middle unit 80 may be rigidly connected to the modular bottom unit 92 by way of glue, screws, a snap-in system or any other manner of rigid connection. Likewise, the modular upper unit 72 may be rigidly connected to the modular middle unit 80 in a similar manner. For example, the modular middle unit 80 may include a connector protrusion 78 extending from the modular middle unit 80. It is contemplated that the modular upper unit 72 may incorporate a connector protrusion receptacle such that the receptacle is larger than the connector protrusion 78, allowing the connector protrusion 78 to slide into the receptacle area. In this configuration, the modular middle unit 80 provides support for the modular upper unit 72 and restricts movement. The desk structure 76 comprising the desktop 88 and privacy partition 86 may also be supported by the modular middle unit 80. It is understood that the desktop 88 and privacy partition 86 may be rigidly affixed to the modular middle unit 80 by way of glue, epoxy, screws or any other means of rigidly affixing.

The modular upper unit 72, modular middle unit 80 and modular bottom unit 92 may, in one embodiment, take the form of a shell such that the interior of each modular unit is hollow or void. Constructed in this manner, less materials are required and thus the cost of the communication structure 70 may be reduced. In this embodiment, communication hardware and power lines may be housed within the communication structure 70. More specifically, the top display 74, upper display 82 and lower display 84 may each be connected to an exterior power source by way of power lines that travel through the hollow interior of each modular unit. Further, an exterior power source may provide electricity to a power port 90 provided on the communication structure 70. In one embodiment, the power port 90 may be provided as part of the desk structure 76 found in the modular middle unit 80. However, the power port 90 may be placed anywhere in the modular bottom unit 92 or the modular top unit 72. Further, the communication structure may provide more than one power port.

In addition to power connectivity, communication hardware may be provided to the top display 74, upper display 82 and lower display 84 by way of communication cables that connect to an exterior communication link to each of the top display 74, upper display 82 and lower display 84. It is contemplated that the communication cables may be placed within the interior of the modular units similar to the power lines. Communication hardware is understood to include Category 5 connectivity, Digital Subscriber Line (DSL) connectivity, fiber optic connectivity and similar Local Area Network (LAN), dial-up, broadband and wireless connectivity. It is contemplated that the communication structure 70 may not be modular but instead may comprise a single structure having a hollow interior, much like the modular units, wherein power and communication hardware may exist. It is alternatively contemplated that the modular top unit 72, modular middle unit 80 and modular bottom unit 92 may be solid non-hallow structures having built in power and communication connectivity.

Figure 5:
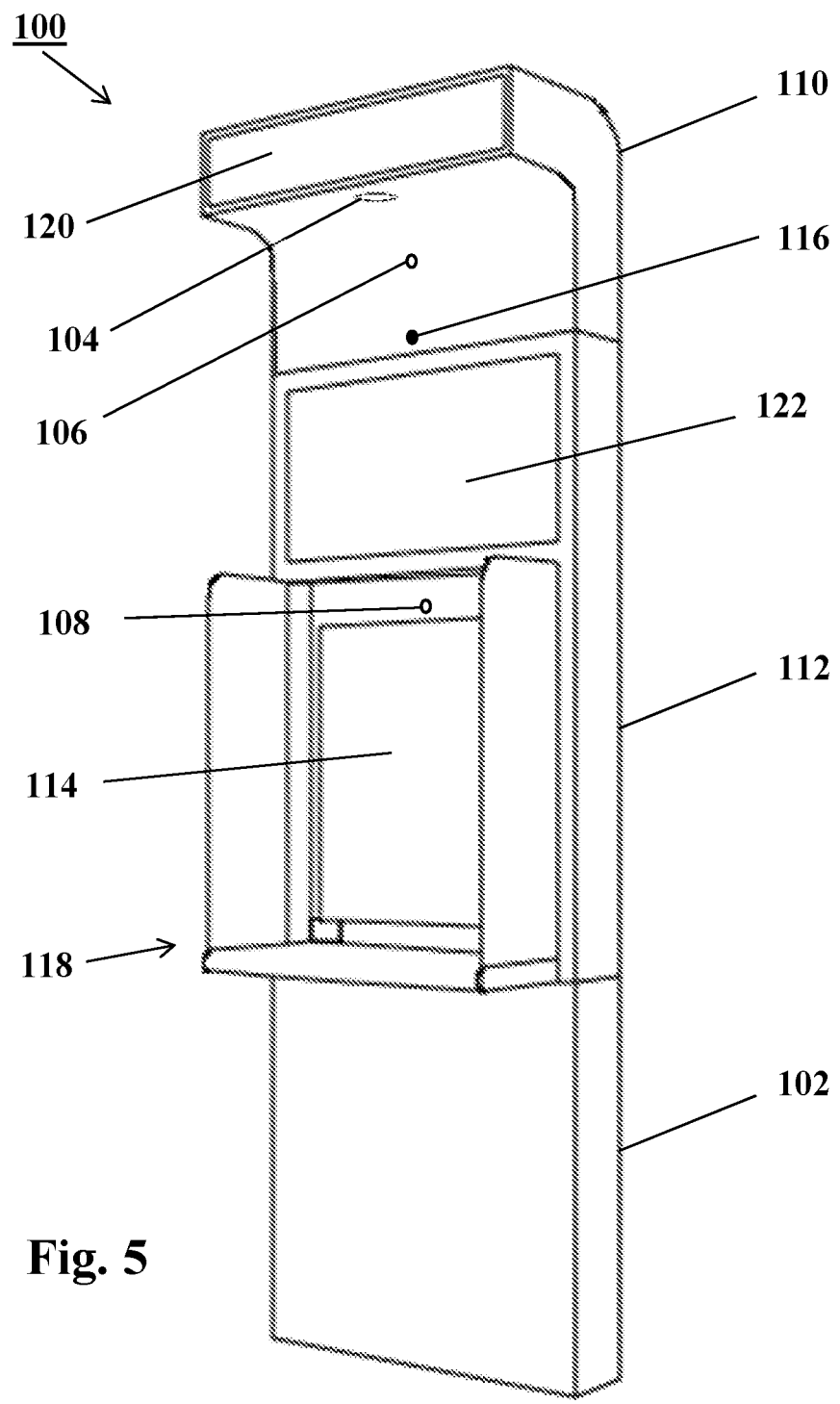
FIG. 5 is a perspective view of an embodiment of a communication structure not having a seating structure in accordance with the present invention.

Referring now to FIG. 5, a seat-less communication structure 100 is shown. In one embodiment, the modular bottom unit 102 may not be affixed or otherwise connected to any seating system. Instead the communication structure 100 may be designed for stand-up use. Accordingly, the communication structure 100 may be configured such that the desk structure 118 may be utilized comfortably while the user is standing. This would require the desk structure 118 to be near the torso level of the user. Alternatively, the communication structure may be configured such that the desktop is adjustable to satisfy the needs of differently sized users. In yet another embodiment, the communication structure 100 may be provided to allow wheelchair access to the desktop structure 118. This configuration may also be appropriate where the communication structure 100 is installed in a narrow passageway and the inclusion of a seat would obstruct passage. The communication structure 100 may also include a seating device that is physically independent of and detached from the communication structure 100.

In another embodiment, the communication structure may include a light source 104 such as an incandescent, LED or florescent light or any other similar source of light. It is contemplated that the light source may be incorporated into the modular upper unit 110 but it is understood that the light source may be alternatively be incorporated into the modular middle unit 112 or the modular bottom unit 102. In another embodiment, the communication structure 100 may include more than one light source 104 being incorporated into any portion of the communication structure 100. The light source 104 may be positioned to shine light towards the desk structure 118 so as to illuminate the surrounding area and allow a user of the communication structure 100 to better view documents or other objects near the desk structure 118.

The communication structure 100 may also include a proximity sensor 116. The proximity sensor 116 may take the form of a passive infrared (PIR) sensor, a pressure sensor, a capacitive proximity sensor or any other sensor capable detecting the presence of a user. The proximity sensor 116 may be in electrical communication with the light source 104, the top display 120, the upper display 122 and the lower display 114. In response to detecting a user, the proximity sensor 116 may send a signal to the light source 104, the top display 120, the upper display 122 and the lower display 104. Upon receiving the signal, the light source 104 may activate an indicating light. For example, in response to a signal from the proximity sensor 116 regarding the presence of a user, the light source 104 may emit a red light. On the other hand, in the absence of this signal, the light source 104 may emit a green light to alert nearby individuals that the communication structure 100 is not in use. Similarly, the top display 120, the upper display 122 and the lower display 114 may display an indication that the communication structure 100 is in use or not in use. For example, the top display 120 may simply display the color green or may display text stating "not in use" or otherwise provide an indicating message.

The communication structure 100 may also include an upper surveillance camera 106 and a lower user camera 108. The upper display camera 106 is provided to capture still images and video images of the area surrounding the communication structure 100. In one embodiment, the upper surveillance camera may be accessed remotely by, for example, government authorities. In this manner, the government authorities may inconspicuously watch for suspicious activity. In another embodiment, the upper surveillance camera 106 may be coupled with face recognition software for detecting known threats and may send an immediate message to local authorities upon the detection of a risk. Like the upper surveillance camera 106, the lower user camera 108 may be utilized to capture still images and video as well. The lower user camera 108, however, is useful for providing images or video for personal communication. In one embodiment, the lower user camera 108 may be used for video conferencing with another communication device for personal use. For example, a traveler may utilize the communication structure 100 to make a video call to a loved one back at home. Additionally, a user may record and send a video message to another.

Figure 6:
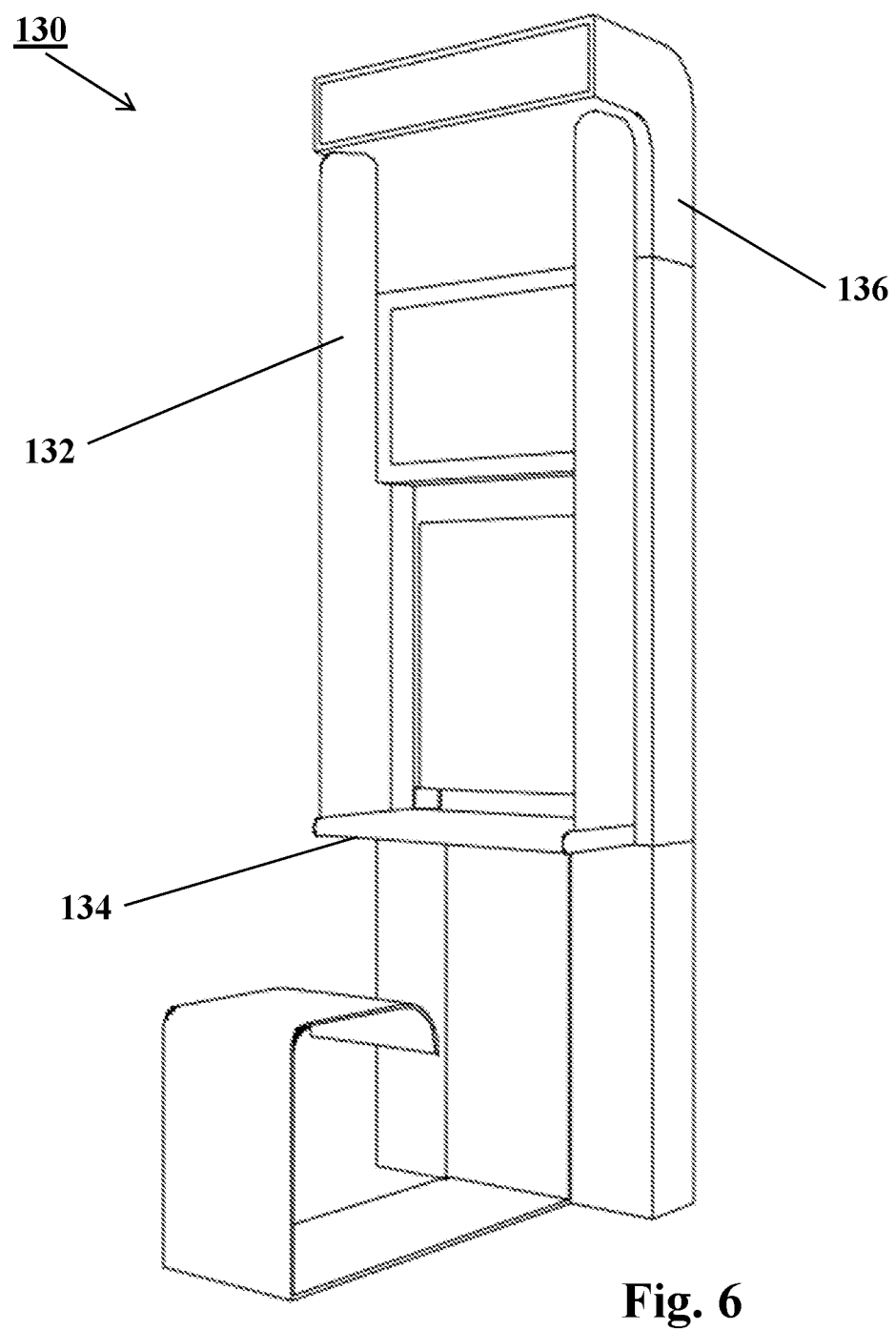
FIG. 6 is a perspective view of an extended privacy partition embodiment of a communication structure in accordance with the present invention.

Referring now to FIG. 6, an extended screen communication structure 130 is shown. In one embodiment privacy partitions 132 may extend from the desktop 134 all the way to the top of the modular upper unit 136. In other embodiments, however, the privacy partitions 132 may extend from the desktop 134 to a certain distance from the top of the modular upper unit, as is seen in FIG. 5. Alternatively, the privacy partition 132 may extend from the bottom of the communication structure 130 to a certain distance from the top of the modular upper unit 126. Further, it is contemplated that the privacy partition 132 may extend outward from the communication structure 130, beyond the desktop 134. In this manner privacy of the user may be increased. It is understood that the privacy partitions 132 may be glass, Plexiglas, plastic or any other like material.

It is further understood that the privacy partition 132 may be clear or may be transparent with a colored tint. It is contemplated that, color may be provided by LED's adjacent to or embedded within the clear privacy partition 132 and may be programmed to alternate color. It is also contemplated that the privacy partition 132 may be opaque to allow some light to shine through while at the same time offering privacy to the user of the communication structure 130. It is further understood, that the privacy partition 132 may be perfectly dark preventing all light from shining through. Alternatively, the privacy partition 132 may be smart glass or a comparable material capable of varying light transmission in response to electricity. It is further contemplated that the privacy partition 132 may also serve as a non-digital display surface for displaying advertisements.

Figure 7:
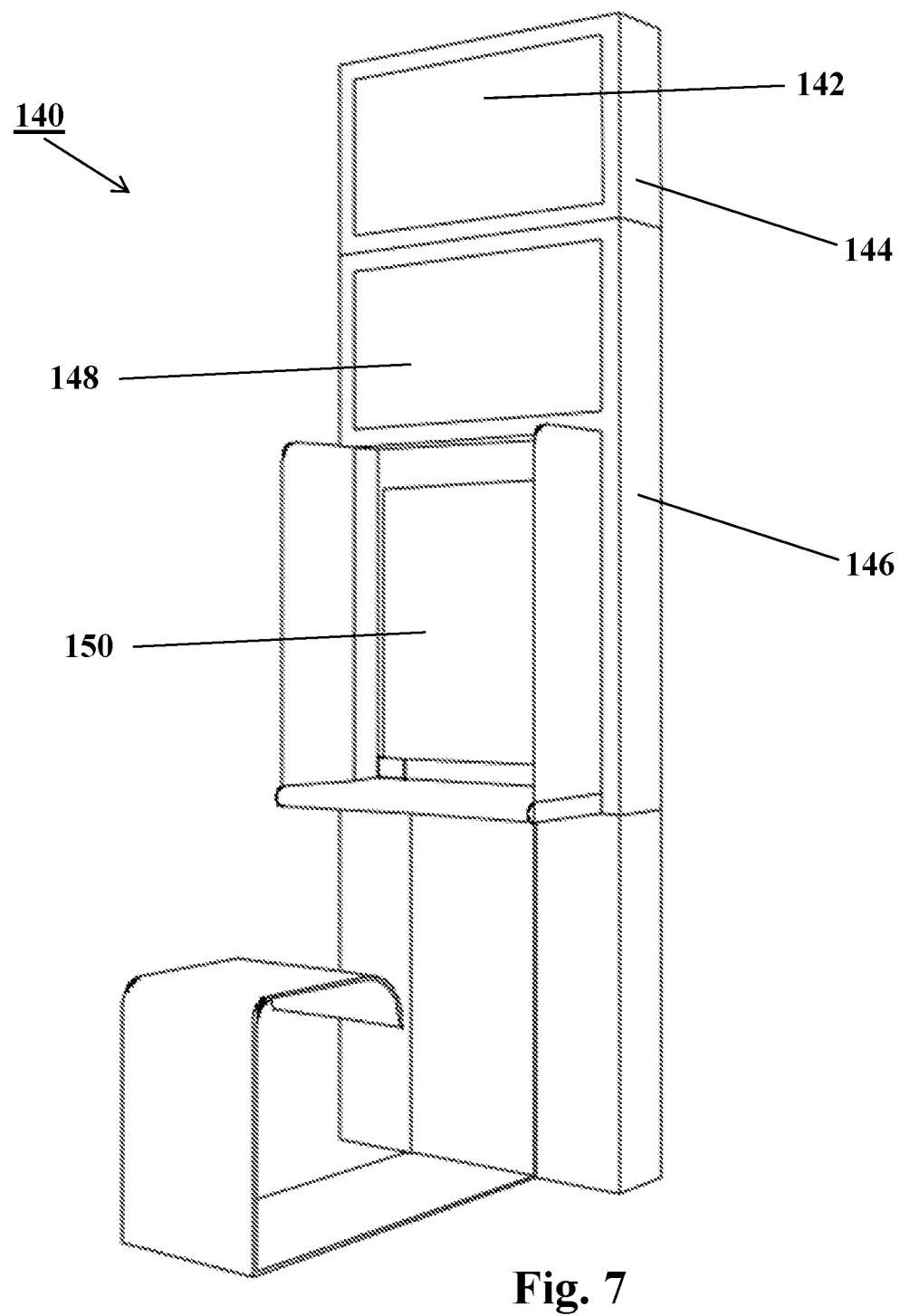
FIG. 7 is a perspective view of an alternative top display embodiment of the communication structure in accordance with the present invention.

Referring now to FIG. 7, a communication structure 140 is provided. In one embodiment of the communication structure 140, the top display 142 may take the form of a large screen display equal or larger in size than the upper display 148 and lower display 150. In this manner the communication structure 140 may offer at least three large displays in an effort to maximize mass communication to the general area surrounding the communication structure 140. To accommodate the a large screen top display 142, the canopy type structure, as seen in FIG. 4 embodying the modular upper unit 72, must be modified. Instead, the large screen top display 142 may be secured to a modular upper unit 144 having a non-curved rectangular shape. It is understood however, that the top display 142 may take the form of alternative shapes and sizes. It is further understood that the top display 142 and upper display 148 may be replaced with one large screen display. To accommodate a large screen display capable of replacing the top display 142 and the upper display 148, the modular upper unit 144 and modular middle unit 146 may be replaced with a single unit or otherwise configured to accommodate a large screen.

Figure 8:
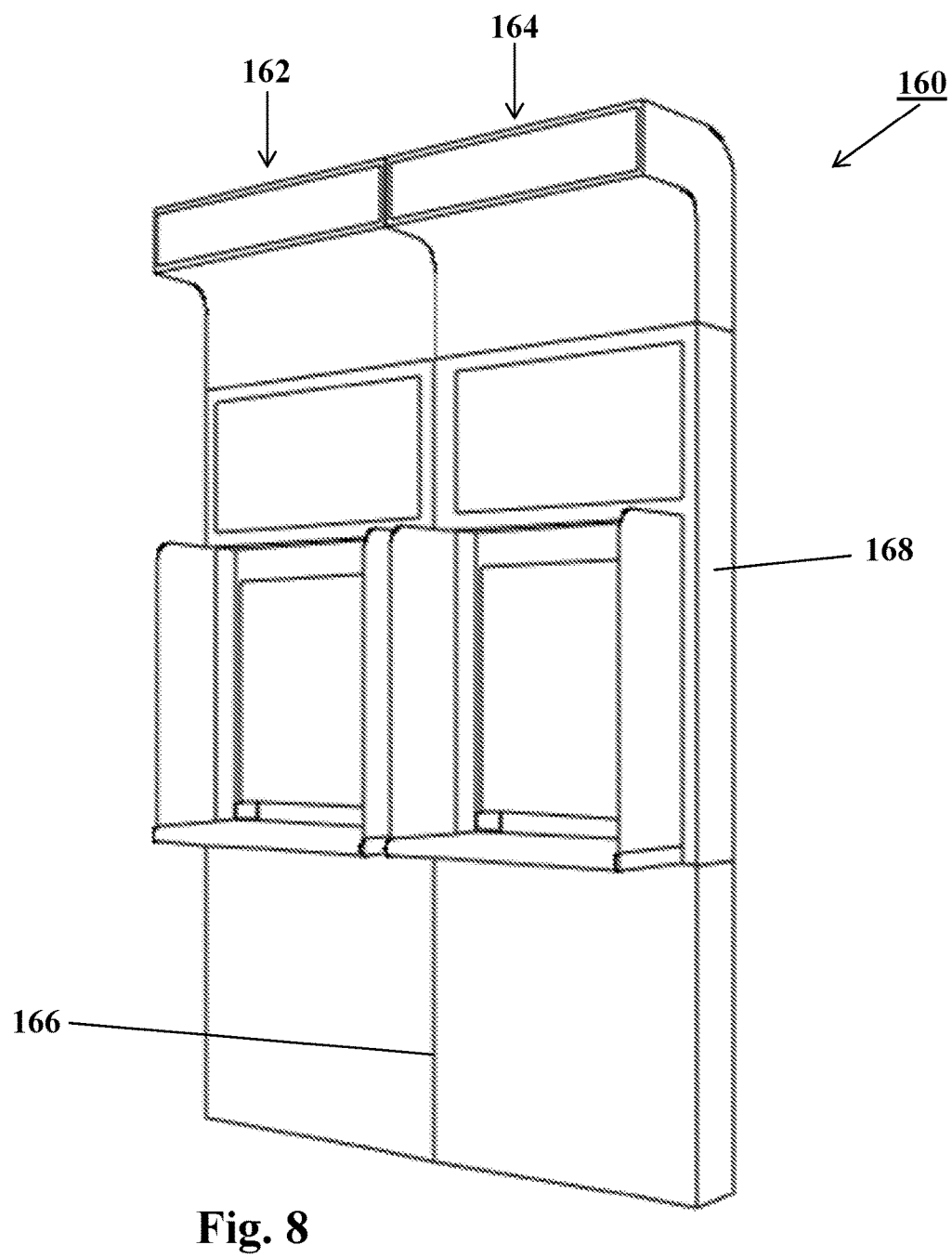
FIG. 8 is a perspective view of a multiunit communication structure assembled in side by side configuration in accordance with the present invention.
Figure 9:
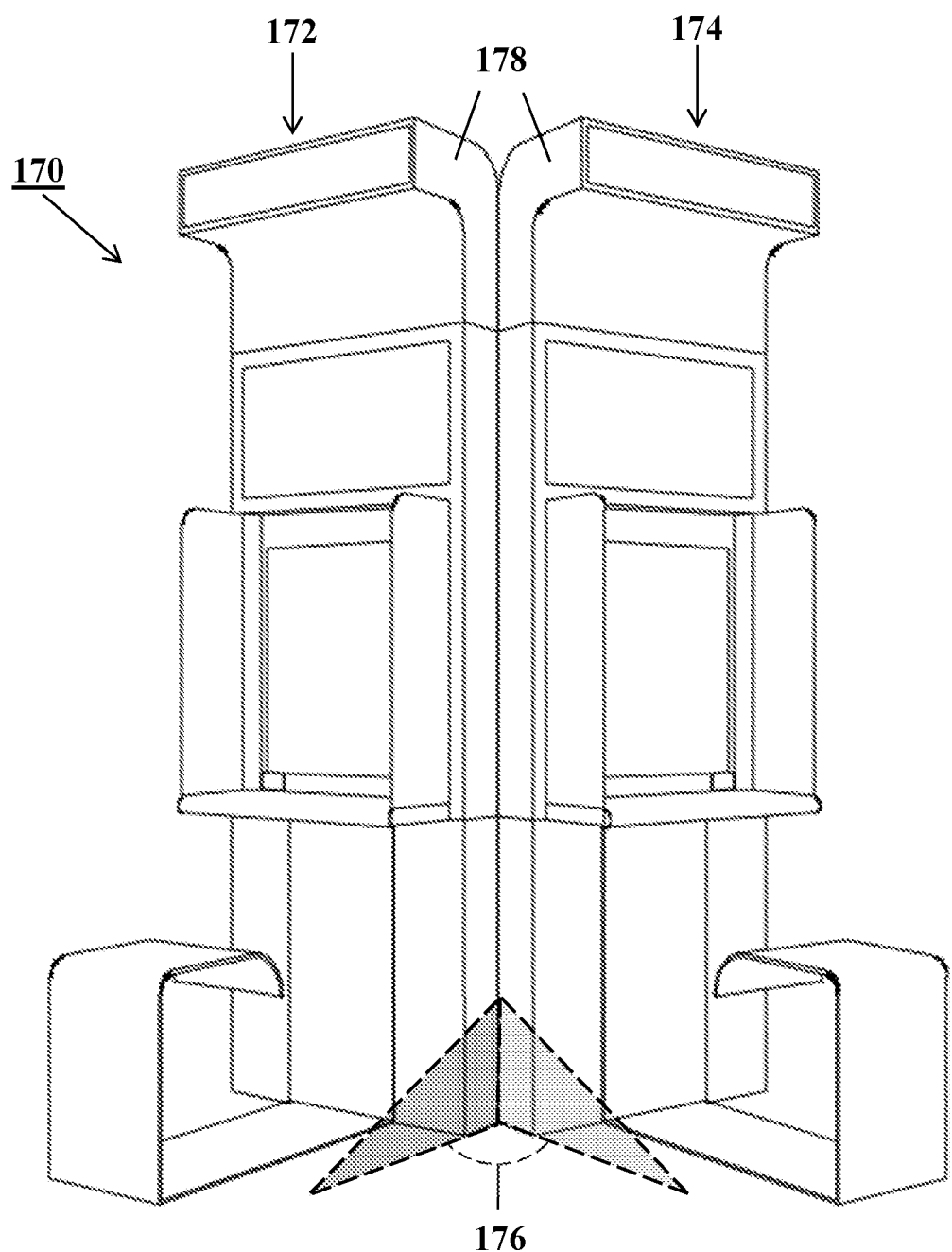
FIG. 9 is a perspective view of a multiunit communication structure assembled in a 90-degree configuration in accordance with the present invention.

Referring now to FIG. 8 and FIG. 9, multiunit communication structure 160 and multiunit communication structure 170 is provided. Both multiunit communication structure 160 and multiunit communication structure 170 illustrate an assembly of communication structures wherein a multiunit structure is formed. It is understood that all communication structures that comprise a multiunit communication structure are in communication with one another either wirelessly or by cable connection. Multiunit communication structures are desirable for providing telecommunication services to more individuals. Multiunit communication structures are also desirable for reaching a broader audience than a single unit communication structure. Multiunit communication structures are capable of reaching a broader audience by not only offering multiple screens and surfaces upon which advertising messages may be placed, but also through the synchronization and coordinated movements between the various screens which attracts attention. In one embodiment, the assembly of communication structures may be arranged in a series to form the multiunit communication structure 160. Arranged in this manner, a first communication structure 162 may be installed directly adjacent to a second communication structure 164. It is contemplated that the first communication structure 162 and second communication structure 164 will be in physical contact with one another along the contact surface 166. It is understood that, where a multiunit communication structure 160 is arranged in series, the contact surface of the first communication structure 162 and second communication structure 164 is the side 168 of the communication structure 164.

Alternatively, the assembly of communication structures may take the form of the multiunit communication structure 170 shown in FIG. 9. Like the multiunit communication structure 160 of FIG. 8, the multi-unit communication structure 170 illustrated in FIG. 9 may comprise of at least a first communication structure 172 and a second communication structure 174. The multiunit communication structure 170 may be arranged such that the a first communication structure 172 is oriented at a certain angle 176 away from a second communication structure 174. It is contemplated that the angle 176 formed between the first communication structure 172 and a second communication structure 174 is defined by a plane projected from the side surface 178 of each structure. Where the angle 176 is formed between the first communication structure 172 and a second communication structure 174 is zero, the first communication structure 172 and a second communication structure 174 are positioned in series as illustrated in FIG. 8. Alternatively, where the angle 176 between the first communication structure 172 and a second communication structure 174 is set at 90 degrees, as is illustrated in FIG. 9, the multiunit communication structure 170 is arranged perpendicularly. Configured in this manner, the multiunit communication structure 170 may be installed at the corner of two walls or may be implemented with a third and fourth communication structure to form a square shaped multiunit communication structure 170. In another embodiment, the angle 176 between the first communication structure 172 and a second communication structure 174 may be set at 180 degrees to provide a back-to-back configuration.

It is understood that the multiunit communication structure 170 may be comprised of more than two communication units. It is further understood that the angle 176 between the communication structures can be varied to accommodate differently shaped multiunit communication structures 170. For example, a multiunit communications structure 170 may incorporate more than two communication structures where the angle between each communication structure is defined at an angle such that the communication structures form a circular multiunit communication structure. A circular multiunit communication structure may be appropriate for implementation around a column support structure or a circular landing, platform or balcony. It is further contemplated that several communication structures may be incorporated into a multiunit communication structure 170 wherein some of the communication structures are in series having an angle 176 of zero degrees and some communication structures are arranged such that the angle 176 is larger than zero. The varying angle multiunit communication structure 170 may be implemented such that the multiunit communication structure 170 is installed against a wall with curvature or designed to wrap around a wall with both flat and angular surfaces.

Figure 10:
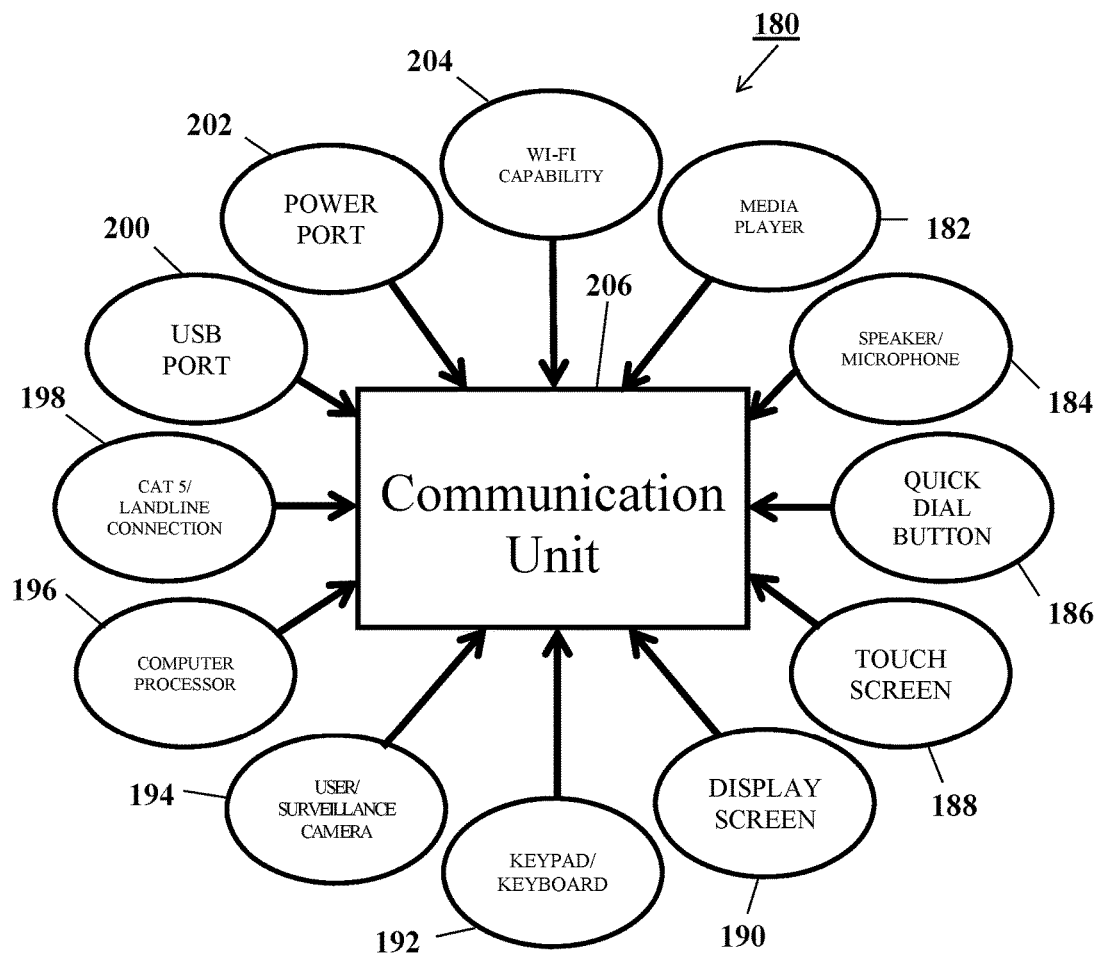
FIG. 10 is a functional diagram of a communication unit in accordance with the present invention.

Referring now to FIG. 10, a functional diagram 180 of a communication unit 206 is provided. The communication unit 206 is representative of the communication unit 48 described in FIG. 1. The communication unit 206 provides for all communication to and from the communication structure. Accordingly, it is contemplated that the communication unit 206 incorporates telecommunication hardware for connectivity between the communication unit and remote telecommunication devices. The telecommunication hardware may take the form of traditional landline 198 connectivity such as a metal wire or fiber optic cable. It is also contemplated that the telecommunication hardware may be category 5 cable 198 or similar twisted pair cable. In an alternative embodiment the communication unit 206 may communicate wirelessly to a remote device and thus support wireless or Wi-Fi 204 capability. To facilitate communication between the communication unit 206 and a remote device, the communication unit may include a speaker and microphone 184. The speaker and microphone may be in the form of a traditional telephone or alternatively may be embedded into the communication structure. In this manner the speaker and microphone may provide speakerphone capability. It is also contemplated that the dial-tone often associated with communication structures may be partially or completely replaced with an advertising message.

User interaction with the communication unit 206 may be facilitated by a keypad 192. The keypad 192 may only have numbers 0-9 or may also include directional keys for interacting with the communication unit or display screens on the communication structure. It is also contemplated that a keypad 192 may be a keyboard having both letters and numbers as well as directional inputs. It is understood that a user may input a phone number into the keypad 192 for communicating with a remote communication device. Further, a user may enter a message using a keypad 192 that be sent as an email, text message or via social media. The communication unit may also incorporate one or more quick dial buttons 186. Quick dial buttons 186 may be programmed to connect a user to emergency services, transportation services, a help desk or may be programmed to connect a user to a representative of a company or entity advertised or otherwise displayed on the communication structure. For example, the quick dial button may connect a user to a hotel being advertised on the communication structure 206. In a different embodiment, the functionality described using a keypad 192 may be instead performed on a touch screen 188. For example, communication unit 206 may be incorporated into the lower display 38 as described in FIG. 2. In this embodiment, the lower display 38 may provide touchscreen capability 18 8 allowing the user to interact with communication unit. It is contemplated that prior to user interaction with the communication unit 206, a visual or audio message may be displayed or otherwise played. In other embodiments, the communication unit 206 may be separate from the touchscreen 188 device. It is also contemplated that the communication unit may include a display screen 190 separate from the top display 32, upper display 36 and lower display 38 illustrated in FIG. 2. In one embodiment, the separate display screen 190 of the communication unit 206 may have touchscreen 188 functionality.

The communication unit 206 may also incorporate a computer processor 196. It is contemplated that the computer processor may be accessed and controlled remotely or may be accessed and controlled on site. Further, the computer processor 196 may provide an operating system for implementing the telecommunication services. It is understood that the computer processor may also operate a media player 182. In conjunction, the computer processor 196 and media player 182 may be used to store, generate, and display video, images, and text on the displays incorporated into the communication structure. The computer processor and media player 182 may also be used to store, generate and broadcast associated audio. Further, the media player may be programmed to coordinate and synchronize the text, images and video displayed on the communication structure as well as the text, images and video displayed on the displays incorporated into the multiunit communication structure as illustrated in FIG. 8 and FIG. 9. For example, where only one communication structure is involved, the media player 182 may be used to display the same text, images or video, display different text, images or video, or display a sequence of related text, images or video on each display of the communication structure.

Where a multiunit communication structure is involved, the media player 182 may be used in the same manner for each display of the multiunit communication structure. In the multiunit communication structure embodiment, while each communication structure incorporated into the multiunit assembly may have a top display 32, an upper display 36 and a lower display 38, as described in FIG. 2, it is contemplated that only one computer processor and media player 182 is required. However, where multiple computer processors are involved in a single multiunit communication structure, one computer processor may act as the a master while the additional computer processors 182 remain inactive. Further, where numerous multiunit communication structures are involved, the computer processor 182 of each multiunit communication structure may communicate with the other for coordination and synchronization of text, images or video.

It is further contemplated that the communication unit 180 may incorporate a power port 202. The power port 202 may act as a charging station for those passing by to charge their smart phones, laptop computers or any other electronics. In effect the power port 202 may attract an audience for the advertisements displayed by the communication structure. It is also contemplated that the communication unit 180 includes a user camera in addition to or instead of a surveillance camera 194. It is understood that a user camera may be implemented that doubles as a surveillance camera 194 when a user is not occupying the communication structure.

In another embodiment, the communication unit 206 may include a USB port 190 in electrical communication with the communication unit 206. In one embodiment, the USB port may allow users to charge their electronic devices. It is also understood that the USB port may allow users to upload data onto to the communication unit. For example, pictures stored on a smart phone device may be uploaded onto a computer processor 196 incorporated into the communication unit 206 and subsequently sent by email or text message, from the communication unit 206 to a remote location. Alternatively, the communication unit may be capable of uploading data onto a user's electronic device. For example, video and music may be purchased from the communication and uploaded to the user's electronic device via the USB port 200. The USB port 200 may also be used in conjunction with a proximity marketing device capable of detecting nearby mobile devices and delivering a text, photographic, video and audio messages to nearby mobile devices having cooperating communication applications. In a different embodiment, the proximity marketing device may be effectuated via means other than USB, such as Bluetooth technology.

In different embodiments, communication unit 84 illustrated in FIG. 4 may also provide services not traditionally associated with communication. For example, the communication structure 70 may further incorporate an Automated Teller Machine (ATM). It is contemplated that the communication unit 84, in conjunction with the upper display 82 and either a keypad or touchscreen capability, may provide a user interface from which a user may interact and communicate with a bank for the purposes of withdrawing money. In the this embodiment the communication structure 30 may also include a currency dispenser in communication with the communication unit 48. The communication structure 70 may also utilize the communication unit 84, upper display 82 and either a keypad or touchscreen capability for checking into a flight or other event and printing out a ticket or purchase receipt from a printer incorporated into the communication device.

What is claimed is:

1. A communication structure, comprising:
    a ridged structure constructed to be affixed to a building surface;
    an upper display on the structure that is positioned to display video content to a general area adjacent the structure;
    a lower display in the structure that is positioned to display a message;
    a communication unit in the structure for providing voice telecommunication to a remote device; and
    wherein the lower display provides interactive control of the communication unit.

2. The communication structure according to claim 1, wherein the lower display and the communication unit are integrally formed.

3. The communication structure according to claim 1, wherein the lower display provides a touchscreen for interaction with the communication unit, and the interaction with the touchscreen is used to control the communication unit.

4. The communication structure according to claim 1, wherein the lower display provides a display for controlling access to the Internet, social media, interactive maps, or email providers.

5. The communication structure according to claim 1, wherein the video content on the upper display is an advertising message.

6. The communication structure according to claim 1, wherein the video content on the upper display is an emergency message generated by local or remote authorities.

7. The communication structure according to claim 1, wherein the message on the lower display is video content or an advertising message.

8. The communication structure according to claim 1, further comprising a top display.

9. The communication structure according to claim 8, wherein the top display is positioned to display other video content to the general area adjacent the structure.

10. The communication structure according to claim 1, further comprising a desk structure adjacent the lower display.

11. The communication structure according to claim 1, further comprising a power port in the structure, the power port positioned for access by a consumer to power an electronic device.

12. The communication structure according to claim 1, further comprising a seat structure.

13. The communication structure according to claim 12, wherein the seat structure is integrally formed with the communication structure.

14. The communication structure according to claim 1, further comprising a speaker system for broadcasting audio messages.

15. The communication structure according to claim 1, further comprising a headset port for providing private audio messages to a user.

16. The communication structure according to claim 1, further comprising a surveillance camera directed towards the area surrounding the communication structure.

17. The communication structure according to claim 1, further comprising a user camera directed towards a user of the communication unit.

18. The communication structure according to claim 1, further comprising a proximity sensor for detecting the presence of a user in the area adjacent the communication structure.

19. The communication structure according to claim 1, further comprising a cellular service signal enhancer providing extended network coverage.

20. The communication structure according to claim 1, wherein the communication unit is capable of detecting nearby mobile devices with cooperating communication applications and delivering text, photographic, video or audio messages to the nearby communication devices.

21. The communication structure according to claim 1, further comprising a reader for facilitating financial transactions.

22. The communication structure according to claim 1, further comprising a Wi-Fi transceiver for communicating with remote devices.

23. The communication structure according to claim 1, further comprising a Bluetooth transceiver for communicating with remote devices.

24. A communication structure, comprising:
a ridged structure constructed to be affixed to a building surface;
an upper display in the structure that is positioned to display video content to a general area adjacent the structure;
a lower display in the structure that is positioned to display a message;
a communication unit in the structure for providing voice telecommunication to a remote device;
wherein the lower display provides interactive control of the communication unit; and
wherein at a first time the message on the lower display is an advertising message directed generally to the public, and at a second time, the message is formed and directed specifically to a user of the communication unit responsive to instructions the user makes to the communication unit using the interactive control.

25. The communication structure according to claim 24, further comprising a seat structure.

26. The communication structure according to claim 24, further comprising a desk structure adjacent the lower display.

27. A communication structure, comprising:
a ridged structure constructed to be affixed to a building surface;
an upper display in the structure that is positioned to display video content to a general area adjacent the structure;
a lower display in the structure that is positioned to display a message;
a communication unit in the structure for providing voice telecommunication to a remote device;
wherein the lower display provides interactive control of the communication unit; and
a surveillance camera directed towards the area surrounding the communication structure.

28. The communication structure according to claim 27, wherein the video content on the upper display is an emergency message generated by local or remote authorities.

* * * * *